United States Patent
Lenz et al.

(10) Patent No.: US 12,299,998 B2
(45) Date of Patent: May 13, 2025

(54) METHOD FOR DETERMINING A VALUE OF A CONTROLLER VARIABLE

(71) Applicant: Robert Bosch GmbH, Stuttgart (DE)

(72) Inventors: Philip Lenz, Holle (DE); Alexander Lengsfeld, Bad Muender am Deister (DE); Marcel Brueckner, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/907,112

(22) PCT Filed: Mar. 22, 2021

(86) PCT No.: PCT/EP2021/057205
§ 371 (c)(1),
(2) Date: Sep. 23, 2022

(87) PCT Pub. No.: WO2021/191120
PCT Pub. Date: Sep. 30, 2021

(65) Prior Publication Data
US 2024/0208514 A1    Jun. 27, 2024

(30) Foreign Application Priority Data
Mar. 25, 2020 (DE) .................... 10 2020 203 836.8

(51) Int. Cl.
*G06V 20/58*     (2022.01)
*B60W 50/00*     (2006.01)
(Continued)

(52) U.S. Cl.
CPC ............. *G06V 20/58* (2022.01); *B60W 50/00* (2013.01); *G06V 10/82* (2022.01); *G06V 20/56* (2022.01);
(Continued)

(58) Field of Classification Search
CPC ......... B60W 50/00; B60W 2050/0002; B60W 2420/403; G06V 20/56
See application file for complete search history.

(56) References Cited

U.S. PATENT DOCUMENTS 6,745,169 B1 * 6/2004 Schlang ................. B21B 37/00
706/16
11,460,857 B1 * 10/2022 Tan ......................... G06N 3/084
(Continued)

FOREIGN PATENT DOCUMENTS

| | | | |
|---|---|---|---|
| JP | 2019-206310 A | 12/2019 |
| KR | 2020-0010983 A | 1/2020 |

OTHER PUBLICATIONS

International Search Report corresponding to PCT Application No. PCT/EP2021/057205, mailed Jun. 2, 2021 (German and English language document) (6 pages).

*Primary Examiner* — Isaac G Smith
*Assistant Examiner* — Nikki Marie M Molina
(74) *Attorney, Agent, or Firm* — Maginot, Moore & Beck LLP

(57) ABSTRACT

A method for determining a value of at least one controller variable for guiding a mobile platform in at least semiautomated fashion is proposed. Images of surroundings of the mobile platform are determined using a plurality of two-dimensionally representing sensor systems. A multiplicity of objects are identified in the images. At least two object features for each of the multiplicity of objects are determined in order to determine the at least one controller variable. An input tensor is generated using the in each case at least two determined object features of the multiplicity of objects for a trained neural network. The value of the controller variable is estimated using the input tensor and the trained neural network.

13 Claims, 2 Drawing Sheets

(51) Int. Cl.
*G06V 10/82* (2022.01)
*G06V 20/56* (2022.01)

(52) U.S. Cl.
CPC ............... *B60W 2050/0002* (2013.01); *B60W 2420/403* (2013.01)

(56) References Cited

U.S. PATENT DOCUMENTS

2018/0232585 A1   8/2018  Kim
2019/0279005 A1*  9/2019  Ogale .................. G05D 1/0221
2020/0142421 A1*  5/2020  Palanisamy .............. G06N 3/08

* cited by examiner

METHOD FOR DETERMINING A VALUE OF A CONTROLLER VARIABLE

This application is a 35 U.S.C. § 371 National Stage Application of PCT/EP2021/057205, filed on Mar. 22, 2021, which claims the benefit of priority to Serial No. DE 10 2020 203 836.8, filed on Mar. 25, 2020 in Germany, the disclosures of which are incorporated herein by reference in their entirety.

The disclosure relates to a method for determining a value of at least one controller variable for guiding a mobile platform in at least semiautomated fashion.

BACKGROUND

For the control of at least semiautomated systems, such as self-driving vehicles or robots as examples of mobile platforms, an interpretation of the surroundings of the mobile platform for, for example, decision-making processes, such as trajectory planning and trajectory control of the mobile platforms, must be carried out.

An essential component of such at least semiautomated systems is their ability to perceive complex situations with respect to their surroundings so that they can be adapted to the respective task.

Modern driver assistance systems (DA) or automated driving functions (AD) utilize environment detection to derive control variables for longitudinal or transverse control of a vehicle and to thus achieve a desired vehicle state or travel a trajectory. These systems require a parameterized interface for controlling the actuator system of the vehicle for a steering mechanism, an engine, or a brake. A steering torque for the transverse guidance and a desired acceleration for the longitudinal guidance is, for example, transferred to the actuators and converted into the actuator system's own control variable.

SUMMARY

Classic controllers for distance control have emerged from radar systems and expect measured three-dimensional variables in world coordinates for the control. Controls for acceleration (ACC, assisted cruise control) are nowadays typically designed by hand and optimized for a vehicle type. This typically involves the use of expensive and complex software packages.

End-to-end methods in which a two-dimensional image of the surroundings is completely taken as input to estimate a control variable, such as a steering angle, represent alternative solutions to implement vehicle control in two-dimensional space.

The transformation from a two-dimensional image space, for example from video recordings, to three-dimensional space is ambiguous, highly non-linear and noisy. Such noisy variables are only conditionally suitable for a classic controller, based on three-dimensional world coordinates, and often behave accordingly inconveniently with respect to a driving behavior.

Such a manual controller parameterization by an application engineer is also difficult to quantify and cannot be generalized across various vehicle applications. The controllers are thus usually designed such that the test drivers instinctively assess the control behavior.

End-to-end machine learning (ML) or deep learning (DL) methods are on the one hand dependent on the sensor, for example, on the respective image pattern, and on the other hand difficult to understand since mapping the image to the control variable is not really comprehensible and additionally difficult to debug. For a safety-relevant component, this characteristic is particularly critical since understanding, modularity and access are important prerequisites for a release process for road traffic. Although there are approaches to understanding end-to-end control, these approaches are not yet mature enough and applicable for serial release. This is because only a quantitative review of the result is usually carried out. Finally, it should be noted that in the case of end-to-end control, the data flow from the respective image to the control variable is very large, which is typically not manageable for controllers of the current generations.

Specified according to the disclosure are methods for determining a value of at least one controller variable for guiding a mobile platform in at least semiautomated fashion, methods for training a neural network, a device, as well as a computer program and a machine-readable storage medium according to the features of the independent claims, which at least in part have the above effects. Advantageous embodiments are the subject matter of the dependent claims and of the following description.

The basis of the invention is the knowledge that a trained neural network can be used to generate values of a controller variable on the basis of objects identified with a two-dimensional sensor system and object features derived therefrom, in order to actuate a controller.

According to an aspect of the disclosure, a method for determining a value of at least one controller variable for guiding a mobile platform in at least semiautomated fashion is proposed, the method comprising the following steps.

In a step of the method, images of surroundings of the mobile platform are determined by means of a plurality of two-dimensionally representing sensor systems. In a further step, a multiplicity of objects are identified in the images. In a further step, at least two object features for each of the multiplicity of objects are determined in order to determine the at least one controller variable. In a further step, an input tensor is generated, in each case, by means of at least two determined object features of the multiplicity of objects for a trained neural network. In a further step, the value of the controller variable is estimated by means of the input tensor and the trained neural network.

A neural network provides a framework for many different algorithms, for example for machine learning, for collaboration, and for the processing of complex data inputs. Such neural networks learn to perform tasks using examples, without typically having been programmed with task-specific rules.

Such a neural network has its basis in a collection of connected units or nodes referred to as artificial neurons. Each connection can transmit a signal from one artificial neuron to another. An artificial neuron that receives a signal can process it and then activate further connected artificial neurons.

In traditional implementations of neural networks, the signal at a connection of artificial neurons is a real number, and the output of an artificial neuron is calculated by a nonlinear function of the sum of its inputs. The connections of the artificial neurons typically have a weight that adapts as learning progresses. The weight increases or reduces the strength of the signal at a connection. Artificial neurons can have a threshold so that a signal is output only when the total signal exceeds this threshold.

A multiplicity of artificial neurons are typically grouped in layers. Different layers may carry out different types of transformations for their inputs. Signals travel from the first layer, the input layer, to the last layer, the output layer, possibly after traversing the layers multiple times.

In addition to the statements on neural networks, the structure of an artificial convolutional neural network consists of one or more convolutional layers, optionally followed by a pooling layer. The sequence of layers can be used with or without normalization layers (e.g., batch normalization), zero-padding layers, dropout layers, and activation functions, such as rectified linear unit (ReLU), sigmoid function, tan h function, or softmax function.

In principle, these units can repeat as many times as desired, and with sufficient repetitions, the neural networks are then referred to as deep convolutional neural networks. Such a convolutional neural network may have a sequence of layers that scan the input grids down to a lower resolution in order to obtain the desired information and store the redundant information.

A recurrent neural network (RNN) is a neural network that, unlike the feed-forward networks, also has connections from neurons of one layer to neurons of the same or a previous layer. This structure is particularly suitable for discovering time-coded information in the data.

According to one aspect, it is proposed that the neural network is a feed-forward network, a recurrent network, a convolutional neural network, or a multi-layer network.

The method may thus advantageously be applied to a multiplicity of types of neural networks.

In this method, a multiplicity of different objects can be identified by the two-dimensionally representing sensor systems and optionally by downstream devices or methods for detecting objects. For example, vehicles, brakes and flashing lights of vehicles, or the switching thereof to warning lights may be detected. Furthermore, freely drivable areas or lines or boundary lines that may define a driving corridor can be identified.

For example, this method may be used to specify the values needed for longitudinal or transverse control, according to a lane departure warning system, of a vehicle. The necessary vehicle state, such as a self-movement of the vehicle, a transverse acceleration, or a yaw rate of the vehicle, is typically available. The control variable for the longitudinal control may be an acceleration and the control variable for the transverse control may, for example, be a steering angle or a steering torque.

In this context, a plurality of two-dimensional sensor systems may comprise a small number of sensor systems, for example one, two, or three sensor systems. Alternatively, the plurality of two-dimensional sensor systems may comprise 100 sensor systems, or an even much higher number of sensor systems may be used to determine images of the surroundings.

This method for determining a value of at least one controller variable allows image data to be used as input for a vehicle controller without non-linear projections of the image data into the three-dimensional space of the world coordinates being performed independently of the control variables, in order to thereby avoid failure propagation resulting from this non-linear projection. As a result, the value of the controller variable can also be robustly estimated for a sensor that does not generate three-dimensional world coordinates. Additionally, by using object detections performed in the two-dimensional image space of the resulting sensor image, the method is independent of the camera sensor used. Thus, an exchange of the camera in the ideal case does not have any effect on a controller operating according to this method, as long as the properties and distribution of the object detections do not change.

The object detectors for identifying the multiplicity of objects may also be exchanged taking into account the required interface for the controller for performing the described method.

By using a neural network trained for this method, it is possible to compare differently trained neural networks or neural networks trained with differently structured input sensors.

Optimized controllers configured to carry out this method can be used at least as a starting point (pre-training) for further applications and/or further products. Such an optimized controller allows for the quantification of the control, for example by evaluating the loss resulting from the training of the neural network. Thus, a generalization across different controller applications or sensors can also be carried out by using individual controllers as the basis for a new application (utilization of a pre-training).

Individual components, for example object detection, an estimation of variables, or a low-level vehicle control, of a system configured to carry out this method can be easily replaced or individually validated since interfaces and range of functions are clearly defined.

Such a system configured to carry out the described method can be trained with the corresponding data to either implement an optimized control of the controller variable across vehicles or implement a control behavior that corresponds to different types of drivers with, for example, a sporty or a comfort-oriented driving style. For example, for a control across vehicles, the neural network can be trained with data from different vehicles.

When using this method for an ACC controller (longitudinal control), an environmental sensor, such as a digital camera or a video camera, for example, detects a vehicle ahead. The driver may adjust a desired speed and a desired distance, or a time gap to the vehicle ahead. With this information, the longitudinal controller maintains the desired speed or the adjusted distance to the vehicle ahead when driving freely.

In order for the adjustment of these variables to be comfortable and not unpleasant for the driver, such a controller must be parameterized in order to minimize variables, such as acceleration and a possible jerk, but also to prevent too sluggish a control behavior at the same time.

In the method presented herein, it is advantageously not necessary for an applicator of such a controller to manually parameterize data of test routes and road traffic for each new vehicle individually. In this respect, even changes to the powertrain of such a vehicle may make new parameterization necessary.

In order to avoid such an individual manual parameterization, the necessary measured variables in the method described herein are not determined in a three-dimensional world coordinate system but in the two-dimensional image space of the two-dimensionally representing sensor system. For example, this means that a video ACC determines the environment by means of a camera as a projection in the two-dimensional image plane of the camera image.

Since a vehicle control typically expects distances and speeds in three-dimensional world coordinates, as a radar sensor, for example, would deliver them, for example a distance and a speed in three-dimensional coordinates, the non-linear and ambiguous projection of the measurements into the world coordinate system in the use of a camera as the environmental sensor must be approximated, which is carried out in the method presented herein by means of the trained neural network, in each case depending on the application.

As a result, a chaining of individual components based on the training of the neural network, including non-linear projections or the like, is optimized and can thus be better mapped. Intermediate steps are inherently also optimized without the need to stipulate external constraints, such as plane assumptions. This ultimately leads to improved control quality of the overall system.

Classic approaches string together such approximative components and accordingly suffer from failure propagation and the resulting and unnecessarily poor projected variables.

According to one aspect, it is proposed that at least one object of the multiplicity of objects is a vehicle and/or a brake light and/or a flashing light and/or a warning light and/or a driving corridor marking and/or a free area.

For example, a vehicle that is identified as an object by means of the two-dimensionally representing sensor system may be characterized by a "bounding box" enclosing the vehicle in the image. The term "brake light" may be understood to mean an activated light on a vehicle that is used to indicate active braking of the corresponding vehicle. The term "flashing light" may be understood to mean an activated light signal of a vehicle, which may thereby indicate a change in the driving direction. Accordingly, an activated warning light indicates that the vehicle equipped therewith is in a particular situation. The term "driving corridor marking" may be understood to mean all markings or transitions that limit a driving corridor for a vehicle. This may be understood, for example, a transition to turf, a line on a roadway, a transition to a roadway shoulder, or even a boundary to parking cars. The term "free area" may be understood to mean the entire area freely drivable by a vehicle.

According to one aspect, it is proposed that the at least two object features are each a characteristic image location of the respective objects.

This may be, for example, an extension of a "bounding box" that characterizes a vehicle. Here, the characteristic image location can be the intersection points of a line to the two-dimensionally representing sensor system with the "bounding box."

According to one aspect, it is proposed that the object feature is an image location of a bounding box of a vehicle and/or a time interval of a time to contact and/or an optical flow of an image sequence and/or a relative movement, for example in the image, and/or activated brake lights and/or an activated turn signal and/or an activated warning light and/or an image location of a roadway marking and/or an image location of a transition to the turf and/or an image location of a transition to the roadway shoulder and/or an image location of a boundary to parking cars and/or an image location of the own travel lane and/or an image location of a boundary of a road and/or an image location of an end of a lane.

A suitable number of objects or object features, which are the basis for the behavior of the trained controller configured to perform the described method, may in each case be selected for the respective control task. The variable "time to contact (TTC)" is the expected time that results in a collision with unchanged driving behavior. A corresponding relative movement may be a relative movement of the ego vehicle in relation to the other vehicles, but the relative movement to the surroundings may also be characterized in this way.

With this method, for example, a distance can be controlled by keeping an object at an image height of 60% of the image and the "time to contact (TTC)" reaching as high a value as possible in order to maintain a time interval of 1.8 seconds in accordance with the traffic regulations.

In other words, this means that the coordinates of the two-dimensionally representing sensor system u and v are used in this method to form the basis for the control.

With the brake light activated, the object feature may also take into account the associated direction indicator, and with the driving corridor marking, information about the driven driving corridor may also be used for the control.

According to one aspect, it is proposed that the controller variable is a value for an acceleration for the mobile platform.

According to one aspect, it is proposed that the controller variable is a value for a steering angle for the mobile platform.

According to one aspect, it is proposed that the neural network is a classification network or a regression network.

That is to say, in other words, the neural network has a structure suitable to perform classification or regression.

For example, the neural network may have an input layer of a dimension of (5×1). In this case, the object features of the input sensor for this input layer of the neural network may comprise scale changes of the bounding box (BBx): BBx height, BBx width, a u coordinate value of an upper left corner of the BBx, and a v coordinate value of the upper left corner of the BBx.

This input layer can be followed by a fully connected layer (FC) with the dimension 25×1.

The next layer of the neural network can then have a fully connected layer (FC) of the dimension 5×1.

This output layer connected thereto can be a fully connected layer (FC) with the dimension 1×1.

The output would then be an acceleration value (a_x) determined via a regression with a so-called mean squared error. With this output, a distance control could be realized.

According to one aspect, it is proposed that the neural network has a plurality of network layers and that the network layers have at least one fully connected layer and/or at least one recurrent layer and/or at least one convolutional layer.

A method for training a neural network for estimating a value of a controller variable for guiding a mobile platform in at least semiautomated fashion is proposed, wherein the method comprises the following steps.

In one step, at least two object features of images from two-dimensional sensor systems of a multiplicity of objects of surroundings of a mobile platform are provided.

In a further step, a desired value of a controller variable is provided, which is to be adjusted for guiding a mobile platform in at least semiautomated fashion when the multiplicity of objects each have at least two object features by means of images of two-dimensional sensor systems of the surroundings of the mobile platform. In a further step, an input tensor for the neural network is generated by means of the respective two object features of the multiplicity of objects. In a further step, a multiplicity of thus generated input tensors is formed with a respectively associated desired value of the controller variable. In a further step, the neural network is trained with the multiplicity of input tensors with respectively associated desired values of the controller variable, for estimating values of the controller variable.

In the training of neural networks, a distinction is typically made between a training phase and a test phase, also called a propagation phase. In the training phase, which consists of a multiplicity of training runs, the neural network learns using a training dataset. Accordingly, the weights between the individual neurons are usually modified. Learning rules specify the way in which the neural network makes these changes.

In supervised learning (monitored or supervised learning), the correct output is predetermined as a "teaching vector" which is used to optimize the parameters of the neural network or the weights, for example weights of a convolution kernel.

In the test phase, on the other hand, no parameters or weights are changed. Instead, on the basis of the already modified weights from the training phase, it is examined whether the network has learned correctly. To this end, the input of the neural network is presented with data and it is checked which output the neural network calculates. In doing so, the initial stimuli already shown to the neural network can be used to check whether the neural network has learned the training material. By presenting new stimuli, it can be ascertained whether the network solves tasks in a generalizing fashion.

The cost function measures how well a present neural network maps a given data set. In the training of a neural network, the weights are changed incrementally such that the cost function is minimal, and the training data set is thus (almost) completely mapped by the neural network.

In the case of a classification problem, this results in the following minimization task:

$$\min_f \sum_{i=1}^{n} V(f(x_i), y_i)$$

where V is referred to as a cost function. The function f describes the neural network. The parameters $x_i$, $y_i$ represent the training data. Since the function $f(x_i)$ describes the neural network, $f(x_i)$ should be equal to $y_i$. The difference between $f(x_i)$ and $y_i$ is calculated using the loss function V. In the sum, the losses of all training data are summed up.

The data for training the neural network can be determined by means of reinforcement learning and by means of an agent who will independently learn a strategy to maximize a reward obtained. Using these rewards, the agent approximates a utility function that describes the value of a particular state or action. Alternatively, the data for training the neural network may be determined by means of behavioral cloning, wherein human sub-cognitive capabilities of drivers are detected. As the respective driver carries out the skill, their actions are recorded along with the situation that led to the action. A log of these records is used as input for the training of the neural network.

According to one aspect, it is proposed that the at least two object features are determined at each of the multiplicity of objects at at least two different points in time; and that the input tensor for the trained neural network is generated with at least two object features of the multiplicity of objects determined in each case at at least two different points in time.

According to this aspect, the method is not only carried out in a single image-based manner, but a time change of the objects for the control behavior is also evaluated by means of a sequence-based consideration. For example, a recurrent neural network may then be used for the neural network. The corresponding object features may then be mapped in multiple layers of the input sensor in order to provide it as an input variable to the neural network. In so doing, the number of points in time used, which indicate a corresponding change in the objects, can be made dependent on the recording frequency of the two-dimensionally representing sensor system and can span a particular time period. A typical time period can range from 1 second to 2 seconds.

A method for determining a value of at least one controller variable for guiding a mobile platform in at least semiautomated fashion is proposed, wherein a first and a second neural network estimate a first value and a second value of in each case at least one controller variable according to the method according to one of the preceding claims, and wherein the respective input tensors for the first neural network and for the second neural network have different object features and/or a different number of object features, and the first value and the second value are compared to one another in order to check a plausibility of the respective values.

In that the value of the controller variable is determined with a first and a second neural network, the system for determining the value becomes redundant. A plurality of differently designed or trained controllers can then be optimized independently of one another. And by means of a decision strategy, implausible controller variables for a regulation or control can be discarded. Thus, a backup of the controller may optionally be simplified or a redundant controller for highly automated driving functions may be implemented in this way.

The plausibility can be checked by means of a "majority decision," at least if three neural networks are used in parallel. If two neural networks were used, "expert knowledge" would determine a maximum deviation of the two predictions from the respective estimate. Once this limit is exceeded, the system would be deactivated. By means of such a redundantly designed system, greater fail safety of the system and reliable operation can be achieved. For example, two different two-dimensionally representing sensor systems in the form of two digital cameras may be used to obtain slightly different perspectives of the images. As long as both neural networks output the same control value in such a case, a reliable value can be assumed. The same applies to different subsets of object features that use the different neural networks as the input variable.

According to one aspect, a method is proposed in which, based on a value of a controller variable determined using a method according to one of the preceding claims, a control signal to actuate an at least semiautomated vehicle is provided; and/or based on a value of a controller variable, a warning signal to alert a vehicle occupant is provided.

The value of the controller variable is the value of at least one controller variable for guiding a mobile platform in at least semiautomated fashion according to the method described above.

With respect to the feature that a control signal is provided based on the value of a controller variable, the term "based on" is to be understood broadly. It is to be understood such that a value of the controller variable is used for any determination or calculation of a control signal, which does not exclude that other input variables are also used for this determination of the control signal.

The control signal may directly be the error signal, but it may also be generated based on the error signal or by means of a converted error signal or in a manner combined with other signals and be sent for actuating or alerting a vehicle occupant of an at least semiautomated vehicle.

On the basis of the control signal, the at least semiautomated vehicle can, for example, limit the speed of the vehicle, no longer provide certain automated driving modes, for example a lane change or a city trip, or actuate a safe operating state, for example by stopping at a roadway edge or an emergency stop.

According to one aspect, a device is provided that is configured to perform one of the methods described above. With such a device, the corresponding method can easily be integrated into different systems.

According to a further aspect, a computer program is specified which comprises instructions that, when the computer program is executed by a computer, cause the latter to carry out one of the methods described above. Such a computer program enables the described method to be used in different systems.

A machine-readable storage medium is specified, on which the computer program described above is stored. Such a machine-readable storage medium makes the computer program described above portable.

In this respect, the term "mobile platform" may be understood to mean an at least semiautomated system that is mobile and/or a driver assistance system of a vehicle. An example can be an at least semiautomated vehicle or a vehicle comprising a driver assistance system. That is to say, in this context, an at least semiautomated system includes a mobile platform in terms of an at least semiautomated functionality, but a mobile platform also includes vehicles and other mobile machines including driver assistance systems. Other examples of mobile platforms can be driver assistance systems comprising a plurality of sensors, mobile multi-sensor robots, such as robot vacuums or lawnmowers, a multi-sensor monitoring system, a manufacturing machine, a personal assistant, or an access control system. Each of these systems can be a fully or semiautomated system.

Throughout this entire description of the disclosure, the sequence of method steps is presented such that the method is easy to comprehend. However, the person skilled in the art recognizes that many of the method steps can also be carried out in a different order and lead to the same or a corresponding result. In this respect, the order of the method steps can be changed accordingly. Some features are numbered to improve readability or to make the association clearer, but this does not imply a presence of particular features.

BRIEF DESCRIPTION OF THE DRAWINGS

Exemplary embodiments of the disclosure are shown in FIGS. 1 and 2*a, b* and are explained in more detail below. The figures show.

DETAILED DESCRIPTION

Figure 1:
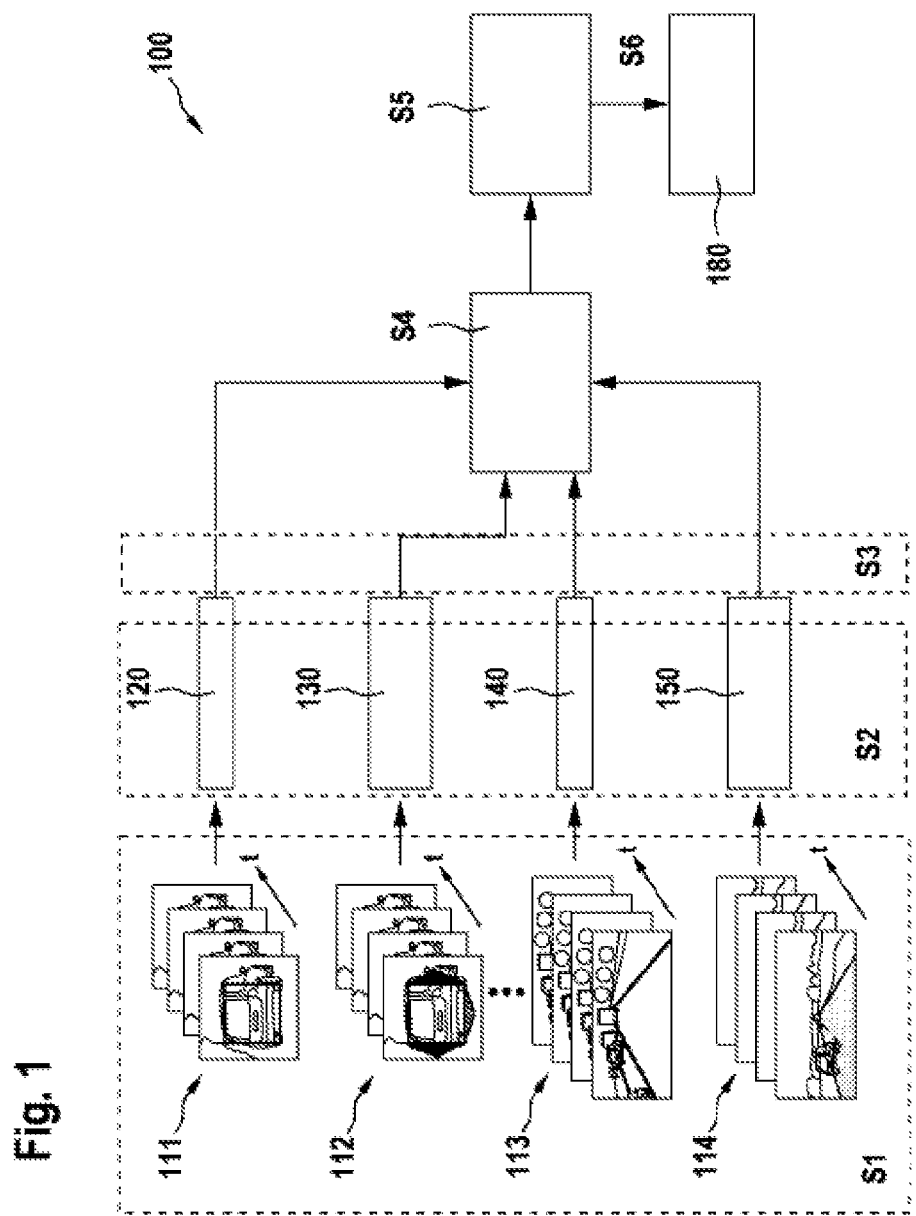
FIG. 1 a method for determining a value of at least one controller variable for guiding a mobile platform in at least semiautomated fashion.

FIG. 1 schematically outlines the method 100 for determining a value of at least one controller variable for guiding a mobile platform in at least semiautomated fashion.

In a step S1 of the method, images 111, 112, 113, 114 from a plurality of two-dimensionally representing sensor systems, such as camera images or video images as raw measurements, are determined over the time t of surroundings of the mobile platform. In a further step S2, with interfaces for functional implementation, vehicle detection 120, braking or blinker detection 130, line or driving corridor detection 140, and a free area detection 150 are, for example, performed and a multiplicity of objects in the images is thus identified. In a further step S3, at least two object features are determined for each of the multiplicity of objects in order to determine the at least one controller variable. In a further step S4, an input tensor is generated, in each case, by means of at least two particular object features of the multiplicity of objects for a trained neural network. In a further step S5, the value of the controller variable is estimated by means of the input tensor and the trained neural network. In a further step S6, the value of the controller variable is transferred S6 to a controller 180.

Figure 2:
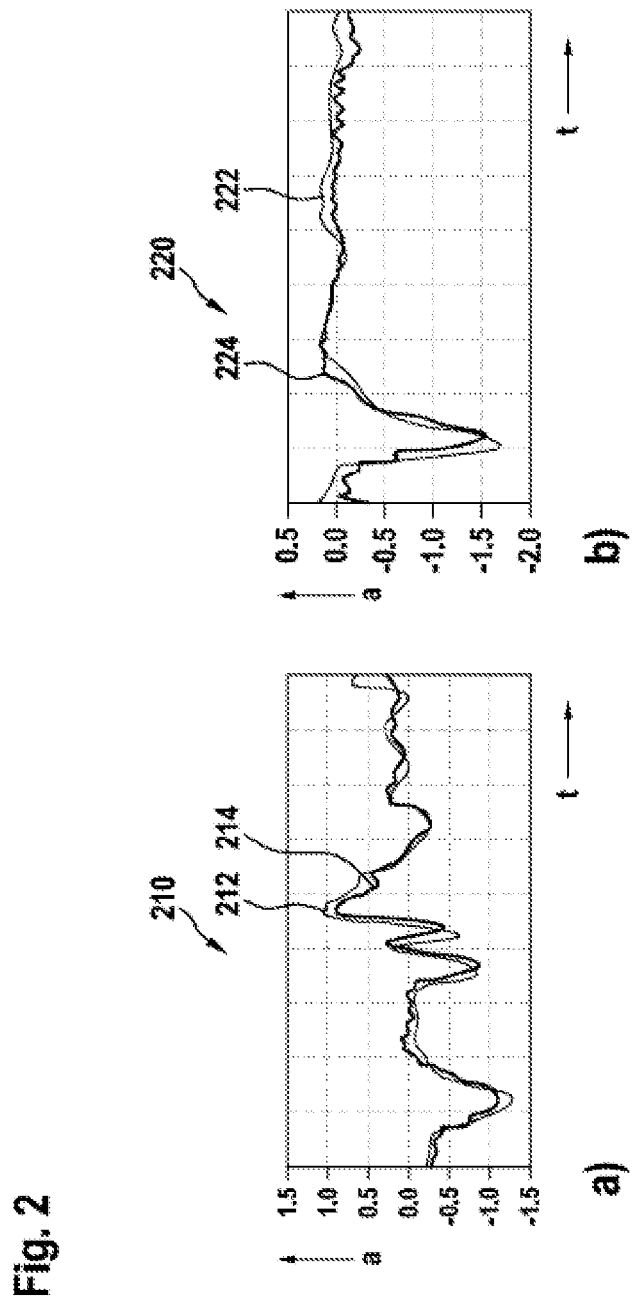
FIG. 2*a* a first example of acceleration values for a controller based on the method proposed herein as compared to a standard method.
FIG. 2*b* a second example of acceleration values for a controller based on the method proposed herein as compared to a standard method.

In FIG. 2*a*, values for an acceleration a over the time t are shown in the diagram 210. The curve 214 shows the values of the controller variable a for the acceleration determined by the method described herein, and the curve 212 shows the corresponding controller variable a, which was determined conventionally, according to a radar controller.

In the diagram 220, FIG. 2*b* shows a second example according to FIG. 2*a*, wherein the curve 224 shows the controller variable a for the acceleration determined by the method described herein, and the curve 222 shows the corresponding controller variable a, which was determined conventionally, according to a radar controller.

The invention claimed is:

1. A method for determining a value of at least one controller variable configured to guide a mobile platform in an at least semiautomated fashion, the method comprising:
    determining images of surroundings of the mobile platform using a plurality of sensor systems;
    identifying a plurality of objects in the images;
    determining at least two object features for each of the plurality of objects;
    generating a first input tensor for a first neural network and a second input tensor for a second neural network using the at least two object features for each of the plurality of objects, the first input tensor and the second input tensor having at least one of (i) different object features and (ii) a different number of object features;
    estimating a first value of the at least one controller variable using the first neural network based on the first input tensor and a second value of the at least one controller variable using the second neural network based on the second input tensor; and
    checking a plausibility of the first value and the second value by comparing the first value with the second value; and
    operating the mobile platform using the first value and the second value.

2. The method according to claim 1, wherein at least one object of the plurality of objects is at least one of a vehicle, a brake light, a flashing light, a warning light, a driving corridor marking, and a free area.

3. The method according to claim 1, wherein the at least two object features for each respective object of the plurality of objects include characteristic image locations of the respective object.

4. The method according to claim 1, wherein the at least two object features for each respective object of the plurality of objects include at least one of (i) an image location of a bounding box of a vehicle, (ii) a time interval of a time to contact, (iii) an optical flow of an image sequence, (iv) a relative movement, (v) activated brake lights, (vi) an activated turn signal, (vii) an activated warning light, (viii) an image location of a roadway marking, (ix) an image location of a transition to a turf, (x) an image location of a transition to a roadway shoulder, (xi) an image location of a boundary to parked cars, (xii) an image location of an own travel lane, (xiii) an image location of a boundary of a road, and (xiv) an image location of an end of a lane.

5. The method according to claim 1, wherein the at least one controller variable includes an acceleration of the mobile platform.

6. The method according to claim 1, wherein the at least one controller variable includes a steering angle of the mobile platform.

7. The method according to claim 1, wherein the first neural network and the second neural network are one of a classification network and a regression network.

8. The method according to claim 1, wherein the first neural network and the second neural network have a plurality of network layers and the plurality of network layers include at least one of: (i) at least one fully connected layer, (ii) at least one recurrent layer, and (iii) at least one convolutional layer.

9. The method according to claim 1, wherein:
the at least two object features for the plurality of objects are determined for each of the plurality of objects at at least two different points in time; and
the input tensor for the trained neural network is generated with the at least two object features of the plurality of objects determined at at least two different points in time.

10. The method according to claim 1, wherein the operating the mobile platform includes at least one of:
a control signal for actuating an at least semiautomated vehicle is provided based on the first value and the second value of the at least one controller variable; and
a warning signal for alerting a vehicle occupant is provided based on the first value and the second value of the at least one controller variable.

11. A device for determining a value of at least one controller variable configured to guide a mobile platform in an at least semiautomated fashion, the device configured to:
determine images of surroundings of the mobile platform using a plurality of sensor systems;
identify a plurality of objects in the images;
determine at least two object features for each of the plurality of objects;
generate a first input tensor for a first neural network and a second input tensor for a second neural network using the at least two object features for each of the plurality of objects, the first input tensor and the second input tensor having at least one of (i) different object features and (ii) a different number of object features;
estimate a first value of the at least one controller variable using the first neural network based on the first input tensor and a second value of the at least one controller variable using the second neural network based on the second input tensor; and
check a plausibility of the first value and the second value by comparing the first value with the second value; and
operate the mobile platform using the first value and the second value.

12. The method according to claim 1, wherein the method is implemented by a computer program that, when executed by a computer, causes the computer to carry out the method.

13. The method according to claim 1, wherein the computer program is stored on a machine-readable storage medium.

* * * * *